(12) United States Patent
Collins

(10) Patent No.: US 11,120,301 B2
(45) Date of Patent: Sep. 14, 2021

(54) METHODS FOR GENERATING A DATASET OF CORRESPONDING IMAGES FOR MACHINE VISION LEARNING

(71) Applicant: Mastercard International Incorporated, Purchase, NY (US)

(72) Inventor: Robert Collins, Dublin (IE)

(73) Assignee: Mastercard International Incorporated, Purchase, NY (US)

(*) Notice: Subject to any disclaimer, the term of this patent is extended or adjusted under 35 U.S.C. 154(b) by 0 days.

(21) Appl. No.: 16/433,045

(22) Filed: Jun. 6, 2019

(65) Prior Publication Data
US 2020/0005083 A1    Jan. 2, 2020

(30) Foreign Application Priority Data

Jul. 2, 2018 (EP) .................................... 18181118

(51) Int. Cl.
*G06T 15/20* (2011.01)
*G06K 9/62* (2006.01)
(Continued)

(52) U.S. Cl.
CPC ......... *G06K 9/6256* (2013.01); *G06K 9/6262* (2013.01); *G06N 20/00* (2019.01);
(Continued)

(58) Field of Classification Search
CPC .... G06K 9/6256; G06K 9/6262; G06N 20/00; G06T 15/20; G06T 15/506; G06T 2200/04
See application file for complete search history.

(56) References Cited

U.S. PATENT DOCUMENTS 8,015,132 B2    9/2011  Xu
8,175,412 B2    5/2012  Basri et al.
(Continued)

FOREIGN PATENT DOCUMENTS

WO    2011002938    1/2011

OTHER PUBLICATIONS

European Search Report and Written Opinion from European Application No. 18181118.3 entitled Methods for Generating a Dataset of Corresponding Images for Machine Vision Learning (dated Mar. 19, 2021).
(Continued)

*Primary Examiner* — Said Broome
(74) *Attorney, Agent, or Firm* — Hovey Williams LLP

(57) ABSTRACT

Machine learning vision systems rely on very large numbers of training images to learn to recognize particular shapes and configurations of shapes. Traditionally, such datasets of training images needed to be selected and tagged (or labelled) manually. To recognize a particular object, such as a dog or vehicle, under realistic settings with an acceptable degree of reliability, may require data sets of thousands of images per object class.
To improve this, a method is provided to generate datasets with a multiplicity of corresponding images are generated using a 3D rendering engine using a plurality of lighting arrangements and a plurality of views. Artefacts may also be introduced. In this way, very large data sets become feasible, with a variable degree of correspondence in each data set.

16 Claims, 5 Drawing Sheets

(51) Int. Cl.
    *G06N 20/00*     (2019.01)
    *G06T 15/50*     (2011.01)

(52) U.S. Cl.
    CPC ............ *G06T 15/20* (2013.01); *G06T 15/506* (2013.01); *G06T 2200/04* (2013.01)

(56) References Cited

U.S. PATENT DOCUMENTS

| | | | |
|---|---|---|---|
| 8,493,432 | B2 | 7/2013 | Taguchi et al. |
| 9,189,888 | B1* | 11/2015 | Cte .................... G06T 17/00 |
| 9,704,054 | B1 | 7/2017 | Tappen et al. |
| 2011/0289030 | A1* | 11/2011 | Lu ...................... G16H 50/70 |
| | | | 706/14 |
| 2014/0079314 | A1 | 3/2014 | Yakubovich et al. |
| 2015/0015581 | A1 | 1/2015 | Lininger |
| 2016/0260210 | A1* | 9/2016 | Gonz Lez ............. G06T 7/0012 |

OTHER PUBLICATIONS

PCT International Search Report and Written Opinion from PCT Application No. PCT/US2019/035931 entitled Methods for Generating a Dataset of Corresponding Images for Machine Vision Learning (dated Sep. 19, 2019).

* cited by examiner

METHODS FOR GENERATING A DATASET OF CORRESPONDING IMAGES FOR MACHINE VISION LEARNING

CROSS REFERENCE TO RELATED APPLICATIONS

This application claims priority to European Application Serial No. 18181118.3, filed Jul. 2, 2018, which is incorporated herein by reference in its entirety

FIELD

The present disclosure relates to methods for generating a dataset of corresponding images for machine vision learning

BACKGROUND

Machine learning vision systems rely on very large numbers of training images to learn to recognize particular shapes and configurations of shapes. Traditionally, such datasets of training images needed to be selected and tagged (or labelled) manually—for example, ImageNet comprises more than fifteen million high-resolution images in approximately twenty-two thousand synsets or sub-categories—these were collected from the internet and labelled and annotated by humans. This provides an average of approximately six hundred and fifty images per synset or sub-category.

To recognize a particular object, such as a dog or vehicle, under realistic settings with an acceptable degree of reliability, may require training using data sets of thousands of images per object class. For situations where the variation in setting can be controlled and limited, for example on a factory production line, it may be sufficient to use smaller data sets.

As machine vision recognition systems start to be used more realistic settings, such as for self-driving vehicles and retail stores, the variations which may be encountered also need to be trained. For example, if a machine vision system attempts to recognize physical credit card at the payment register, the user may hold the credit card at many different orientations, or part of the card may be obscured due to the user holding it. In addition, under realistic conditions, the machine vision system may be required to recognize the object being purchased—obscuration is a problem, but the consumer may wish, for example, to purchase more than one object, so the machine vision should preferably recognize a plurality of objects. Traditionally, these systems are trained by a using datasets of corresponding images, followed by a further training under realistic conditions. However, this increases the training time until an acceptable reliability and accuracy in recognition is achieved. Increasing the size of training datasets to tens of thousands of corresponding images is being pursued using appropriately trained image classifiers, but a high degree of human interaction and checking is still required to ensure that the labelling and annotation corresponds sufficiently with the object or objects depicted in the images.

It is an object of the invention to provide an improved method for generating a dataset of corresponding images which is suitable for machine vision learning.

General Statements

According to a first aspect of the present disclosure, there is provided a computer-implemented method for generating a dataset having a multiplicity of corresponding images for machine vision learning, the method comprising: loading a seed model into a 3D rendering engine; selecting a first lighting arrangement; selecting a first view of the seed model; rendering the first view of the seed model with the first lighting arrangement; storing a 2D image of the first view of the seed model with the first lighting arrangement; repeating the rendering and storing using a plurality of further views and a plurality of further lighting arrangements to generate a multiplicity of 2D images of the seed model; and generating a dataset comprising the corresponding multiplicity of 2D images of the seed model.

The invention is based on the insight that the two most critical parameters when recognizing real-world objects are the view and the lighting arrangement. The invention is based on a further insight that a multiplicity of suitable training images may be generated conveniently and repeatedly using a 3D rendering engine, repeating the rendering for a plurality of views and a plurality of lighting arrangements. This produces a high degree of correspondence.

According to a further aspect of the current disclosure, the method further comprises: selecting one or more camera artefacts; rendering the seed model with the one or more camera artefacts; storing a 2D image of the seed model with the one or more camera artefacts; and repeating the rendering and storing with the one or more camera artefacts to generate a dataset comprising the corresponding multiplicity of 2D images of the seed model.

By anticipating the conditions which may be encountered in subsequent object recognition, the accuracy and/or reliability of the recognition may be increased. In addition, reducing the time and effort to create a dataset of corresponding images may be used to create datasets with a narrower correspondence than is currently used, speeding up the learning even more—for example, for a traffic camera which is to be placed in a fixed position, vehicles will only be expected to approach from certain angles. The dataset may be generated for these angles only, narrowing the correspondence closer to the real-world recognition conditions.

According to a further aspect of the current disclosure, the method further comprises: associating a 2D image of the seed model with one or more corresponding labels; and generating a dataset comprising the corresponding multiplicity of 2D images associated with one or more corresponding label.

One or more labels, also called annotations or tags, may be used to inform the machine vision learning system what the object to be recognized should be. This may speed up the training of the vision system. In addition, the labels may also be used to separate the 2D images generated into one or more classification before commencing machine vision training—for example, only images comprising one or more vehicles.

According to a further aspect of the current disclosure, the method further comprises: selecting a first background; rendering the seed model in front of the first background; storing a 2D image of the seed model in front of the first background; and repeating the rendering and storing using a plurality of further backgrounds to generate a dataset comprising the corresponding multiplicity of 2D images of the seed model.

A frequent problem with object recognition is that the machine vision learning system may recognize an object very accurately based upon a common background in the images. For example, vehicles are frequently pictured on road, and boats in water. By providing additional 2D images with different backgrounds, such problems may be reduced.

According to a further aspect of the current disclosure, the method further comprises: loading a further seed model into a 3D rendering engine; rendering the first view of the further seed model with the first lighting arrangement; storing a 2D image of the first view of the seed model and the first view of the further seed model with the first lighting arrangement; and repeating the rendering and storing using a plurality of further views and a plurality of further lighting arrangements to generate a multiplicity of 2D images of the seed model and the further seed model; and generating a dataset comprising the corresponding multiplicity of 2D images of the seed model and the further seed model.

Preferably, objects are recognized accurately and/or reliably under realistic conditions. This includes two or more instances of the same object and/or two or more instances of different objects. Using a 3D rendering engine provides a very flexible and convenient way to generate almost any combination of object representations using the appropriate data model.

According to a still further aspect of the present disclosure, a computer-implemented method for recognizing an object is provided, comprising: generating a dataset according to invention having a multiplicity of images corresponding to the object; providing the dataset to a machine learning algorithm for use as a training set, a test set and/or a validation set to recognize the object; and analyzing a plurality of additional images to recognize if the object is present in the image.

The reliability of recognition of objects may be improved by improving the degree of correspondence and/or the number of corresponding images in a dataset.

According to a further aspect of the present disclosure, the computer-implemented method for recognizing an object further comprises: monitoring a condition corresponding to the one or more labels; and analyzing a plurality of additional images to recognize if the object is present in the image when the condition is partially or wholly complied with.

By providing accurate labelling regarding the conditions under which the image is generated, the reliability of machine recognition may be improved by monitoring the corresponding condition and taking it into account during image analysis by the machine vision recognition system.

BRIEF DESCRIPTION OF THE DRAWINGS

Features and advantages of some embodiments of the present invention, and the manner in which the same are accomplished, will become more readily apparent upon consideration of the following detailed description of the invention taken in conjunction with the accompanying drawings, which illustrate preferred and exemplary embodiments and which are not necessarily drawn to scale, wherein.

DETAILED DESCRIPTION

In the following detailed description, numerous non-limiting specific details are given to assist in understanding this disclosure. It will be obvious to a person skilled in the art that the method may be implemented on any type of standalone system or client-server compatible system containing any type of client, network, server, and database elements.

Figure 1:
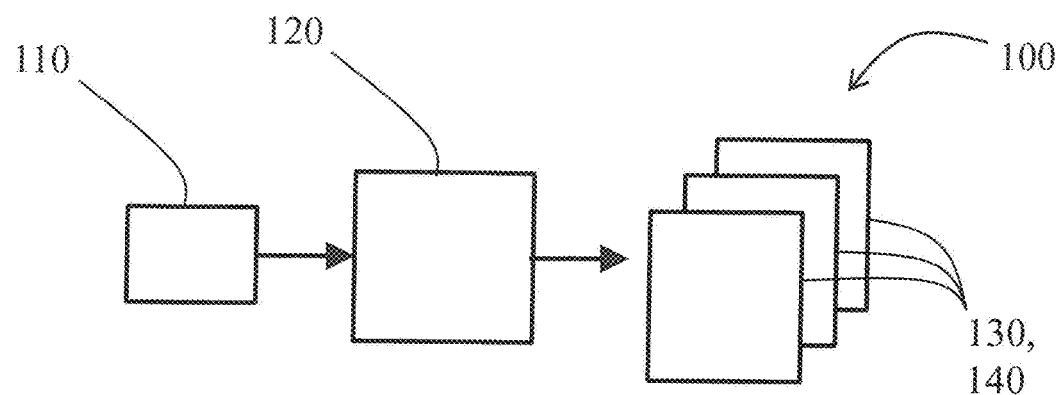
FIG. 1 depicts a computer-implemented method for generating a dataset having a multiplicity of corresponding images for machine vision learning.

FIG. 1 depicts a computer-implemented method for generating a dataset 100 having a multiplicity of corresponding images 130 suitable for machine vision learning.

A seed model 110 is selected for generating a corresponding multiplicity of 2D images corresponding to an object using a 3D rendering engine 120—these images may be subsequently used to train a machine vision learning system or apparatus to recognize the object. Preferably, a multiplicity of corresponding images 130 are provided in the dataset 100 to increase the accuracy and/or reliability of the recognition, especially under realistic or real-world conditions. One or more images may be associated with a label 140.

The invention is based on the insight that a problem with current datasets of images is the degree of correspondence. For example, if the object to be recognized in the real world is a car, then the current approach is to collect as many different images of cars as possible in the set—in many cases, these images are associated by humans with the corresponding label "car" using, for example, crowd-sourcing tools, such as Amazon's Mechanical Turk tool. These images will have a varying degree of correspondence caused by, for example:

different sizes, different distances to the car, different angles;

different types of car, different colors of the same type of car, similar models of car;

different lighting, different backgrounds, blurred images due to motion;

multiple cars, obscuration to some degree;

blur, lighting flare, defocusing, pixelization, grain, edge clarity, translation, rotation, scaling, image size; and noise, aliasing, image compression, resolution, color banding, quantization, macro blocking, mosaicking (or mosaicking), ringing, posterizing.

A low degree of correspondence between the images used for machine learning may reduce the accuracy of the recognition and typically increases the training time and effort to achieve and acceptable degree of recognition. But a lack of good datasets means that known machine learning systems must use whatever is available, or humans must be used to manually improve the datasets by, for example, deleting outlier or poor images.

So, accurate machine vision relies on accurate training data. Objects in the real world may be, for example, illuminated from multiple light sources, each with different qualities.

By using the dataset generator according to the invention, a dataset may be provided with a high degree of correspondence, taking into account the real-world application in which recognition is to take place. For example, a traffic camera which is to be placed in a fixed position:

may only need to reliably recognize vehicles approaching from certain angles. The dataset may be generated for these angles only, narrowing the correspondence closer to the real-world recognition conditions.

should be reliable in all weather conditions. The dataset may comprise different types of lighting associated with such weather conditions, and different types of reflection from the surfaces of cars during wet, dry and misty conditions.

should be reliable at different time of day. The dataset may comprise different types of lighting associated, both natural and man-made.

may only need to reliably recognize vehicles against a dark, asphalt roadway. The dataset may be generated for such backgrounds only, narrowing the correspondence closer to the real-world recognition conditions.

The seed model 110 may be any convenient data representation of the object to be recognized, although CAD data is preferred as this inherently comprises more than one view. Additionally, the seed model 110 data may further comprise physical information such as exterior panels or include thicknesses, materials, and finishes. Such parameters may affect the appearance, for example, under different lighting conditions an at different angles.

The seed model 110 is loaded into a 3D rendering engine 120, such as POV-Ray or Blender, and rendered under different conditions—preferably, these are selected based upon the real-world recognition conditions. 2D images are made under each condition. This generates a dataset 100 comprising a multiplicity of corresponding 2D images 130 of the seed model 110.

Preferably, the 3D rendering is realistic, and more preferably it is photo realistic. Parameters which determine the degree of photo realism include:

a material applied which realistic mimics how the outer surface of the object would appear in the real world. The surface finishing may also play a role. The appearance may be influenced by, for example, how reflective the object is, whether the material is transparent and to what degree, the light absorption, and whether the material exhibits subsurface scattering.

a lighting arrangement 150 which realistically illuminates the seed model 110. Preferably, the lighting arrangement 150 generates real world lighting artifacts, such as shadows, variable light strength and variable light brightness.

Most preferably, HDRi (High Dynamic Range Imaging) is used for lighting arrangements 150 as this provides more realistic rendering with a high range of color and light, compared to low dynamic range formats. The rendering engine may then be considered to perform High Dynamic Range Rendering (HDRR), capturing the amount and direction of light in a scene.

The seed model 110 may be rendered using a plurality of virtual lighting arrangements 150. The arrangements 150 to be used are typically selected depending on the environment and surroundings that the object is to be recognized in. For example, if the object is a table lamp, indoor lighting arrangements are preferably included. Lighting arrangements 150 may differ, for example, in light source position, distance to the seed model 110, intensity, luminance, radiance, color spectrum, light direction, luminous intensity, radiant intensity, solid angle of emittance or any combination thereof.

The way different light sources interact with the surface materials of objects may substantially change how the object appears in the rendered image. Different surface materials may impact the lighting arrangement e.g. materials which experience specular reflections may have artificial visual artefacts introduced—reflections of the background. The location of these will change as lighting arrangements change. For example, a bumpy surface texture illuminated by directional lighting may show features not visible under broad environmental lighting. To achieve a high degree of correspondence, the lighting setup may be altered as the plurality of renderings is produced: the number, position, type of light (environment, area, spot), color, direction. By varying the lighting on the 3d model, the trained computer vision model will focus on what stays common within the image data set.

A further problem with conventional image datasets is that they comprise a limited number of views. For example, available datasets depicting dogs and cats are often taken from social media or image sharing sites and usually just show the view from the front, with the face occupying a large portion of the image. The face is substantially unobscured. This is the view that the owners of the animals usually share—the advantage is that this increases the degree of correspondence between the images. However, machine visions learning systems being trained with these images become reliable at recognizing cats and dogs when provided with a view from the front with a substantially unobscured face. If the face is partially obscured, or a side view is shown, the recognition reliability may drop considerably.

The seed model 110 may be rendered using a plurality of virtual views 160—for each view 160, a virtual camera 160 is used to determine the view 160. Views 160 may differ, for example in virtual camera position, distance to the seed model 110, the direction of the view, the angle of incidence of the view on a surface of the seed model 110, the focal point, the focal plane, the degree of perpendicularity, or any combination thereof. The larger the number of views. the more reliable object recognition will become.

Figure 2:
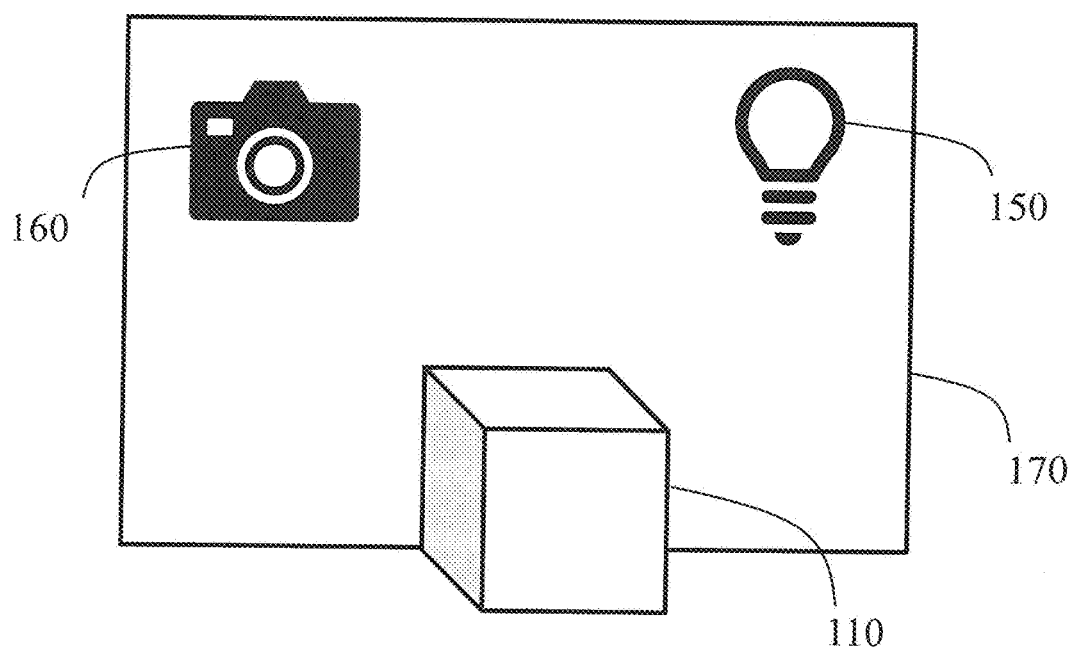
FIG. 2 depicts the basic 3D depicts exemplary elements which may be varied when rendering a seed model.

FIG. 2 depicts exemplary elements which may be varied when rendering a seed model 110. A first virtual view 160 may be selected by suitably positioning a virtual camera 160. A first virtual lighting arrangement 150 may be selected by suitably positioning a virtual light source 150, which may be an artificial light source or a simulation of a natural light source. Each combination of view 160 and lighting arrangement 150 may also be called a scene. The model is called a seed model 110 because it is the basis for the multiplicity of the images to be generated as a dataset.

Figure 3A:
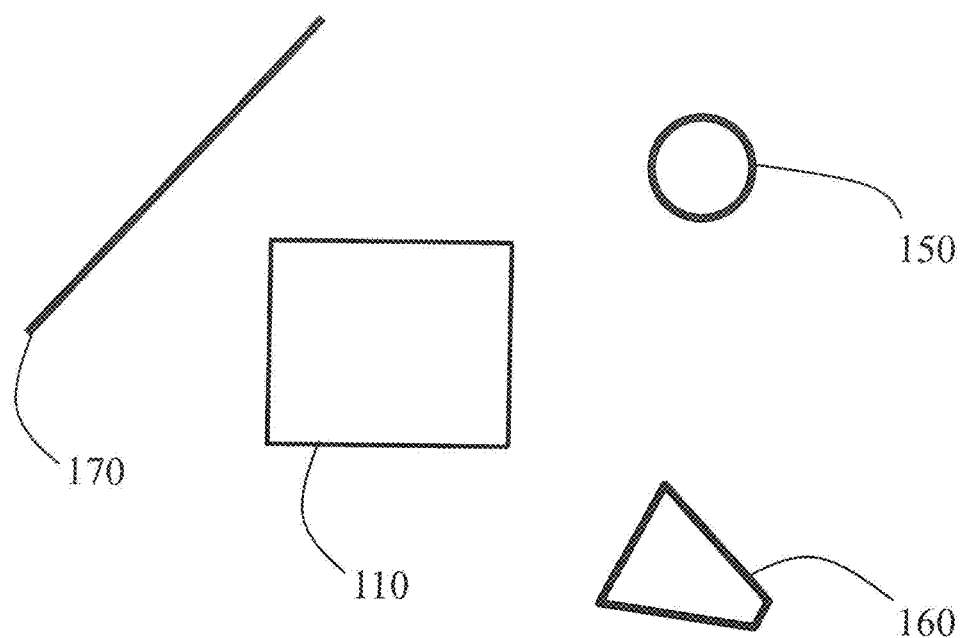
FIGS. 3A-3C depict three different views which may be used when rendering a seed model.

The 3D rendering engine 120 renders a first view 160 of the seed model 110 with the first lighting arrangement 150—this first scene is depicted in FIG. 3a. At least one 2D image 130 is stored of this scene.

Figure 3B:
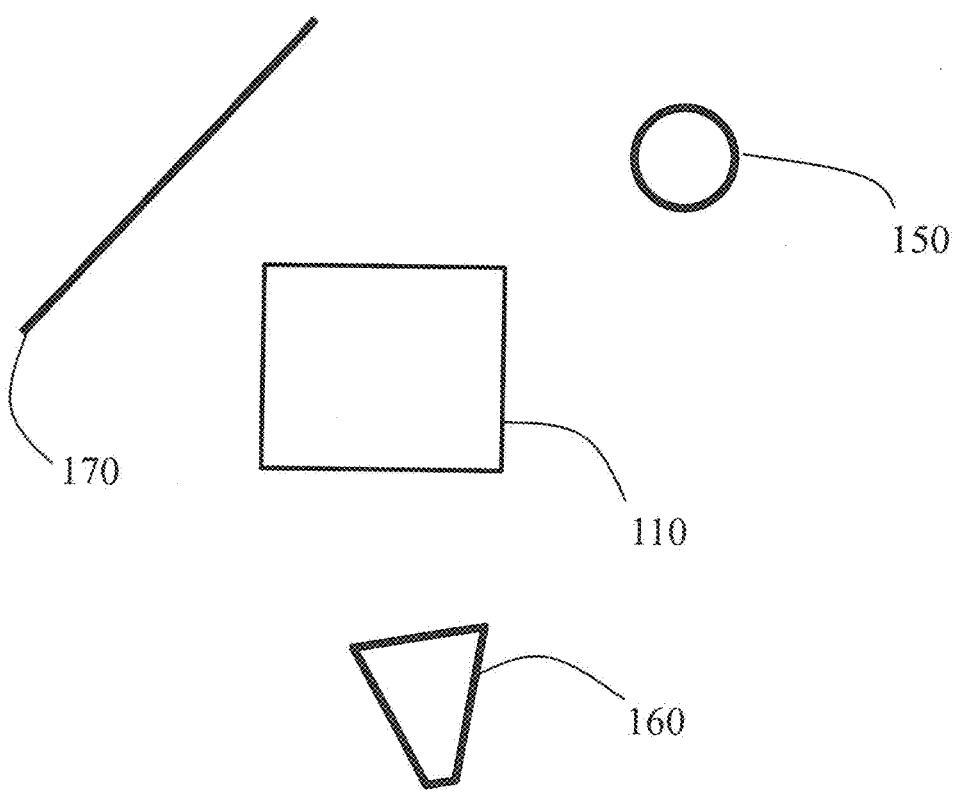

A further scene is depicted in FIG. 3b. The virtual camera 160 is positioned at a second position to define a second view 160. In this example, the virtual light source 150 is kept in the same position and the lighting arrangement 150 is kept the same as in FIG. 3b. At least one 2D image 130 is stored of this scene.

Figure 3C:
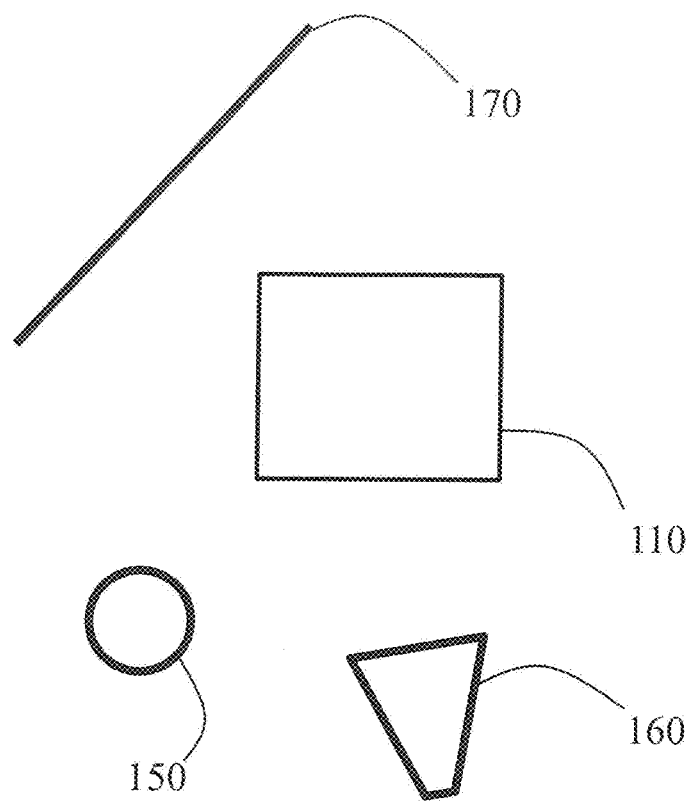

Yet another scene is depicted in FIG. 3c. The virtual light source 150 is positioned at a second position to define a second lighting arrangement 150. In this example, the view 160 is kept the same as in FIG. 3c. At least one 2D image 130 is stored of this scene.

This is repeated for a multiplicity of scenes by storing 2D images of a plurality of views 160 with a plurality of lighting arrangements 150. This generates a dataset 100 comprising a multiplicity of 2D images 130 corresponding to the seed model 110.

Such a dataset generated by this method may be used for machine vision learning—for example, as a training set, a test set and/or a validation set. The advantage of the methods disclosed are the high degree of control which may be asserted over the correspondence of the 2D images.

A further problem with current datasets of images is the lack of suitable numbers of images for many objects—the invention may be used to generate very large numbers of 2D images to be included in a dataset. It is only limited by processing power and storage space, so thousands, tens of thousands, hundreds of thousand, millions or even more may be generated using this method. The invention may also be used to provide additional images to balance the number of examples in a new class when extending the recognition capabilities of an existing machine vision learning system.

Preferably, the dataset comprises a multiplicity of at least one thousand images provided to train each sub-category. Most preferably, at least ten thousand images are provided for training a classifier with an acceptable reliability.

Optionally, a first background 170 may also be selected by suitably positioning a virtual background 170. The seed model 110 may be rendered using a plurality of virtual backgrounds 170. Backgrounds may differ, for example in background shape, position, texture, distance to the seed model 110, the angle of incidence of the background to a surface of the seed model 110, the degree of perpendicularity, the thickness, the materials, the transparency, the reflectivity, the light absorption, the finish or any combination thereof. Although the background is depicted schematically as a rectangle, any convenient 2D or 3D shape may be used, including semicircular, hemispherical or spherical.

Control of the background is important to focus object recognition on the object, represented in the 3D rendering engine by the seed model 110, and not on the background of the image behind the object.

It may therefore be advantageous to change the background 170 used in rendering the different scenes. This may be done by applying a random background 170 texture to any planer surfaces, such as floors and walls, positioned around the seed model 110. The random background texture 160 may be, for example, an image chosen from a large set of real world photos or a procedurally generated texture. For example, for a traffic camera, recognition from above of a vehicle in front of a dark background, resembling asphalt, may be appropriate. However, if the traffic camera is to be mounted at road level, then recognition in front of different sky backgrounds is more appropriate.

Additionally or alternatively, the properties of the virtual camera 160 may comprise one or more camera artefacts. This may improve recognition accuracy and/or reliability as real-world problems may be anticipated. These artifacts may include, for example, blur, lighting flare, defocus, translation, rotation, scaling, noise, motion, pixelization, edge clarity, aliasing, image compression, color banding, grain, quantization, macro blocking, mosaicking (or mosaicking), ringing, posterizing, and any combination thereof. It may be an artefact related to, for example, the dimensions and position of the camera, the optical properties, the sensor properties, the data compression, or any combination thereof.

For example, in the real world, objects will not appear well lit and in perfect focus. Cameras, and in particular handheld cameras and phone cameras, may have, for example, blur, shadowed objects and obscured (to some degree) objects. The camera may not be level, for example, or the object may not be at the same scale.

To improve recognition accuracy and/or reliability, this real world 'noise' may be applied during the generation of the 2D images 130, either directly in one or more scenes, or as a post-processing step on one-or more images, or a combination thereof.

Preferably, more than one artifacts are introduced into one or more of the 2D images. For example, the following post-processing may be applied to one or more of the 2D images:

cloning the original 2D image scaling the cloned image randomly using a normal distribution between 50 and 150% applying a blur to the cloned image with a random radius (uniform distribution) and/or 'motion' translating the cloned image by a random (normal distribution) amount in a random direction.

rotating the image by a random (normal distribution) amount applying "random shadow" to the image. For example, by selecting a random area in the cloned image e.g. a circle or radius 50 px and increasing or decreasing the lightness and saturation for that set of pixels.

saving the cloned image with artifacts as a further 2D image comprised in the dataset 100.

The advantage of post-processing is that no new 3D rendering was required. Alternatively, a separate 2D image 130 may be stored separately for each camera artefact.

Optionally, it may be advantageous to move the virtual camera 160 to different points along a locus to provide the plurality of views 160. For example, in a substantially circular path around the seed model 110. More complex loci may also be advantageous, such as substantially spherical or substantially hemispherical around the seed model 110. It may be further advantageous to position the virtual camera 160 at symmetrical points along the locus.

By reducing some of the variability between 2D images, the time to train may be reduced because the machine vision learning system may be provided with similarly created datasets for different objects—for example, once the machine learning system has achieved a high degree of accurate recognition of a car using one thousand standardized views 150 and illumination arrangements 160, learning to recognize a large truck using the same views 150 and illumination 160 may be quicker.

Figure 4:
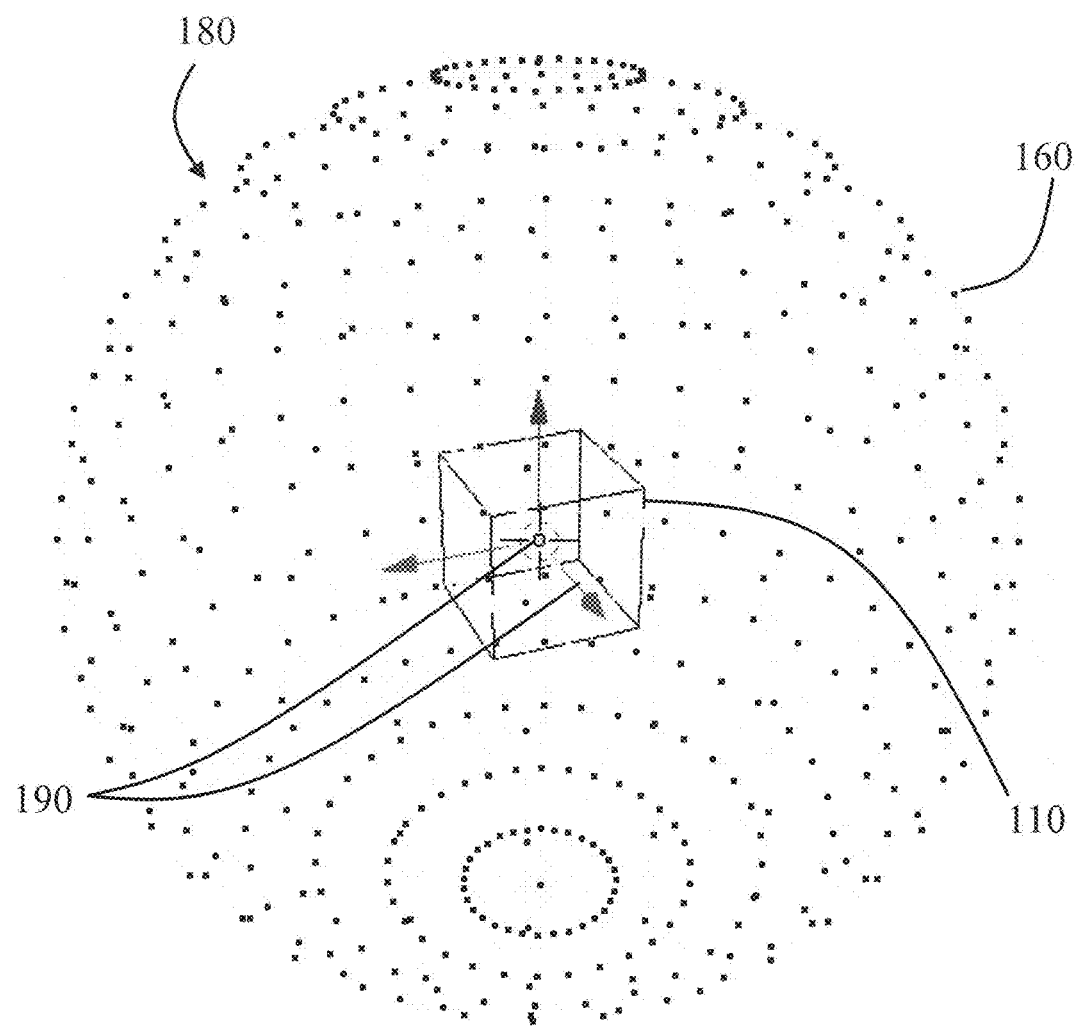
FIG. 4 depicts possible loci of a virtual camera around a seed model.

For example, FIG. 4 depicts the seed model 110 as a cube, disposed at the center of a virtual sphere 180. The virtual sphere 180 represents a possible locus of the virtual camera 160 as it moves around the seed model 110. The plurality of views 160 may be generated by moving the virtual camera 160 to a plurality of predetermined positions on the sphere while keeping the virtual camera focused on the seed model 110. After rendering at each view, a 2D image 130 would be stored.

For example:

a sphere 180 around the seed model 110 with 32 rings and 32 segments results in 994 vertices (or intersections)—each vertice may be a virtual camera position 160. The rings and segments are depicted in FIG. 4 as circles of latitude and longitude. Each intersection, or vertice, is depicted as a point, and represents a virtual camera position 160.

five lighting arrangements 150 for each camera position 160 results in approximately 5 000 scenes, for which approximately 5000 2D images 130 are stored.

applying five different post-processing steps, such as those indicated above, generates an additional 25000 2D images 130

The image set 100 in this example comprises approximately 30000 corresponding 2D images 130 of the object represented by the seed model 110. Use of a 3D rendering engine allows very large datasets 100 with a high correspondence to be generated quicker and easier than using the current methods of manual checking and tagging.

The degree of correspondence between datasets 100 of different seed models 110 may be further increased by defining a reference point 190, or reference axes, and aligning the seed model 110 and the camera locus 180 about this reference. It may also increase the degree of correspondence between datasets 100 of the same seed model 110 generated at different moments.

A further problem with conventional datasets is the lack of suitable images. When a 2D image, such a photo is produced, it typically only captures one view. 3D camera systems are available, but these are expensive and not widely available. It is therefore almost impossible to collect an image dataset 100 comprising a plurality of views of the same object.

A further advantage of the invention is that the seed models 110 of man-made objects are easily available from the 3D CAD systems used to design them—for example, vehicles, furniture, buildings, furnishings. Many CAD programs even include data models 110 of natural objects, such as trees, cats, dogs and birds. For natural objects, the degree of photo realism may not be accurate enough for teaching reliable recognition. It may be advantageous to first train a machine learning visual system with a dataset 100 easily generated by the invention, and to fine tune the system using corresponding photo datasets from the known sources.

The virtual sphere 180 represents nominal camera positions 160 equidistant from the geometric center of the seed model 110. It may be advantageous to use another 3D shape such as a cube, a cylinder, a prism, a triangular prism, an octagonal prism, a pyramid, a cone, a hemisphere, a polyhedron. The shape may also be distorted, or non-symmetrical, by varying the distance from the seed model 110 at different points along the loci of the virtual camera 160.

Increasing the number of predetermined camera positions 160 increases the number of 2D images that will stored—this may increase the accuracy and/or reliability of the subsequent object recognition after the training.

Figure 5:
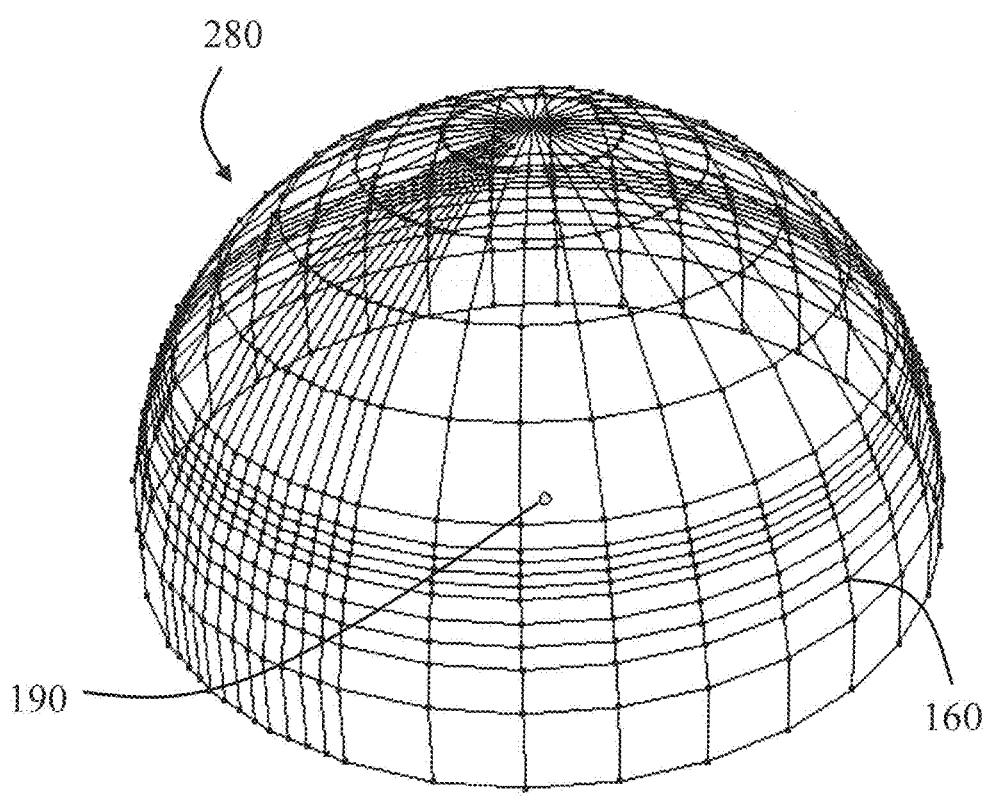
FIG. 5 depicts a further example of the loci of a virtual camera around a seed model.

Increasing the number of predetermined positions 160 may also increase processing time and the data storage size required to store the dataset 100. This may be reduced by limiting the views 160 to the most common viewing angles to be expected during object recognition. For example, for something that only needs to be recognized from above, such as a table lamp, only virtual camera positions 160 on one side of the seed model 110 may be sufficient. Similar to FIG. 4, the seed model (not shown) is disposed at the center of a virtual hemisphere 280 in FIG. 5. The virtual hemisphere 280 represents the possible locus of the virtual camera 160 as it moves around the seed model 110. The plurality of views 160 may be generated by moving the virtual camera 160 to a plurality of predetermined positions on the hemisphere while keeping the virtual camera 160 focused on the seed model 110. After rendering at each view, a 2D image 130 would be stored. The density of camera positions 160 may also vary to cover the most likely positions and viewing angles expected in the real world. The degree of correspondence between datasets 100 of different seed models 110 may be further increased by defining a reference point 190 as explained for FIG. 4.

A further problem with conventional dataset is the poor and inconsistent identification for images. For example, the Flickr8K dataset comprises more than 8,000 photos, or images, and up to 5 captions for each photo. These captions have been provided manually by a combination of experts and crowdsource volunteers, together with an evaluation of the suitability of each caption for the photo. Captions for one of these photos include:

"Two motorists riding along in their vehicle that is odd in design and color"

"Two persons in a small race car, drive by a green hill"

In most cases, the identification is solely based on storing corresponding images in a folder with a name associated with those images—for example "Dogs" and "Cats".

It may also be advantageous to us the invention to provide annotation, labelling and/or tagging of the 2D images 130. During generation of the dataset, one or more 2D images 130 are associated with a label 140 corresponding to the seed model 110. These labels may simply indicate the classification, such as dog, car, boat, or the labels may also include data about, for example, the views 160, lighting arrangement 150, background 170, camera artefact or any combination thereof. Any conventional metadata format may be used. Preferably a format is used which preserves the context of the label—for example, teal may be a color or a species of duck, flare may be an optical artefact or a signal flash.

A suitable format may be based on the Exchangeable Image File format (EXIF), as this already includes standard tags, or labels, associated with conditions when the image was created, or in many cases when the photo was taken. A translation of version 2.31, revised in 2016, is available here: http://www.cipajp/std/documents/e/DC-008-Translation-2016-E.pdf Tags which may be useful for implementing the invention include: ImageHeight, ImageLength, Compression, XResolution, YResolution, WhitePoint, ImageDescription, DateTime. Additional labels may be included using the free text strings such as: Make, Model, Software, Artist. The MakerNote and UserComment tags may be to provide proprietary labels or to extend the standard label set.

Additionally or alternatively, other tags or labels may be used such as TIFF (Tagged Image File Format), DNG (Digital Negative), and/or XMP (Extensible Metadata Platform.

When used with a suitably modified machine vision learning system, such labels may be used to greatly increase the speed of learning. If the machine learning system processes the images which are blurred due to motion, for example, and labelled as such, learning time may be reduced as the machine learning system may learn to recognized blurred variants of the object.

After deployment of the machine vision learning system in the real-world, it may be advantageous to provide sensors or parameter input to monitor one or more condition corresponding to one or more labels. Partial or whole compliance with a monitored condition may be used to assist in the machine recognition.

For example, a laser or radar beam may be used to measure speed, so the machine vision system expects a blurred image. In a further example, a rain sensor may indicate that the machine vision learning system should expect rainy conditions and wet cars. Such sensors may be local and provide direct input, or indirect such as a weather forecast using remote sensors and computer modeling. Similarly, a light sensor may be used to monitor local light conditions, or sunrise/sunset data may be monitored based on GPS coordinates and a calendar, so the machine vision system expects a dark or bright image.

It may also be advantageous to simultaneously render two or more instances of the same seed model 110 if this is a common problem to be expected with object recognition. For example, recognizing multiple objects in a shopping cart means that different objects must be recognized, as well as multiple instances of the same object. A traffic camera may need, for example, to recognize more than one vehicle in a single image, when they are both cars or one is a car and one is a truck.

The method is further modified by including the first instance and a further instance of the same seed model in the first view 160. Storing a 2D image 130 of this first view of the first instance of the seed model 110 and the first view 160 of the further instance of the seed model 110. This is then repeated for a plurality of further views and further lighting arrangements 150, in the same way as disclosed above.

The dataset 100 generated comprises a multiplicity of corresponding 2D images 130 of more than one instance of the seed model 110.

These may optionally be labelled as being associated with either the object represented by the seed model 110 and/or more than one instance of the object represented by the seed model 110.

Similarly, two or more different seed models 110 (a seed model and a further seed model) may be rendered, rendering and storing using a plurality of further views 160 and a plurality of further lighting arrangements 150 to generate a multiplicity of 2D images 130 of the seed model 110 and the further seed model 110. The dataset 100 comprises a multiplicity of corresponding 2D images 130 of two or more different seed models 110.

These may optionally be labelled as being associated with either object represented by the seed model 110, the object represented by the further seed model and/or the combination of both objects.

The datasets generated using the disclosed methods may also be advantageously used to train image classifiers.

By using the invention, very large numbers of images may be generated with different degrees of correspondence:

a dataset with a multiplicity of images with a low degree of correspondence corresponding to a particular object viewed under all possible conditions these may be suitable for validation, testing and fine tuning a dataset with a multiplicity of images with a high degree of correspondence corresponding to a particular object under certain conditions—these may be suitable for initial training. Such datasets may be used in series—for example, first to learn to recognize large dogs, then to recognize medium size dogs and then to recognize small dogs.

datasets with a multiplicity of images with a high degree of correspondence corresponding to a particular object may also be used to train a machine learning system about certain objects that should not be recognized—for example, a traffic camera may be required to not recognize trucks, and a classifier may be required to not recognize a cat as a small dog.

Although the invention is disclosed as generating a multiplicity of 2D images (130) using a 3D rendering engine (120), it may be advantageous to alternatively generate a 3D dataset—this may improve training time still further because the dimensional information, such as distance, orientation, angle and views, may be interpreted more directly from the 3D information, instead of indirectly from one or more labels.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

REFERENCE NUMBERS

100 a dataset having a multiplicity of corresponding images for machine vision learning

110 a seed model
120 a 3D rendering engine
130 a 2D image
140 a corresponding label associated a first 2D image
150 a lighting arrangement
160 a view
170 a background
180 a virtual spherical camera locus
190 a reference point
280 a virtual hemispherical camera locus

What is claimed is:

1. A computer-implemented method for generating a dataset having a multiplicity of corresponding images for machine vision learning, the method comprising:

loading a seed model into a 3D rendering engine;
selecting a first lighting arrangement;
selecting a first view of the seed model;
selecting one or more camera artefacts;
rendering the first view of the seed model with the first lighting arrangement and the one or more camera artefacts;
storing a 2D image of the first view of the seed model with the first lighting arrangement and the one or more camera artefacts;
repeating the rendering and storing using a plurality of further views and a plurality of further lighting arrangements and the one or more camera artefacts to generate a multiplicity of 2D images of the seed model;
generating a dataset comprising the corresponding multiplicity of 2D images of the seed model; and
training a machine learning algorithm using the dataset.

2. The computer-implemented method according to claim 1, wherein the camera artefact is selected from the group comprising:

blur, lighting flare, defocusing, translation, rotation, scaling, image size, obscuration, noise, motion, pixelization, edge clarity, aliasing, image compression, resolution, color banding, grain, quantization, macro blocking, mosaicing, ringing, posterizing, and any combination thereof.

3. A computer-implemented method for generating a dataset having a multiplicity of corresponding images for machine vision learning, the method comprising:

loading a seed model into a 3D rendering engine;
selecting a first lighting arrangement;
selecting a first view of the seed model;
selecting a first background;
rendering the first view of the seed model with the first lighting arrangement and in front of the first background;
storing a 2D image of the first view of the seed model with the first lighting arrangement and in front of the first background;
repeating the rendering and storing using a plurality of further views and a plurality of further lighting arrangements and using a plurality of further backgrounds to generate a multiplicity of 2D images of the seed model;
generating a dataset comprising the corresponding multiplicity of 2D images of the seed model; and
training a machine learning algorithm using the dataset.

4. The computer-implemented method according to claim 3, the method further comprising:

associating a 2D image of the seed model with one or more corresponding labels; and
generating a dataset comprising the corresponding multiplicity of 2D images associated with one or more corresponding labels.

5. The computer-implemented method according to claim 3, the method further comprising:
  loading a further seed model into a 3D rendering engine;
  rendering the first view of the further seed model with the first lighting arrangement;
  storing a 2D image of the first view of the seed model and the first view of the further seed model with the first lighting arrangement; and
  repeating the rendering and storing using a plurality of further views and a plurality of further lighting arrangements to generate a multiplicity of 2D images of the seed model and the further seed model; and
  generating a dataset comprising the corresponding multiplicity of 2D images of the seed model and the further seed model.

6. The computer-implemented method according to claim 3, the method further comprising:
  loading a further instance of the seed model into the 3D rendering engine;
  rendering the first view of the further instance of the seed model with the first lighting arrangement;
  storing a 2D image of the first view of the seed model and the first view of the further instance of the seed model with the first lighting arrangement; and
  repeating the rendering and storing using a plurality of further views and a plurality of further lighting arrangements to generate a multiplicity of 2D images of the seed model and the further instance of the seed model; and
  generating a dataset comprising the corresponding multiplicity of 2D images of the seed model and the further instance of the seed model.

7. The computer-implemented method according to claim 3, wherein:
  the locus of a virtual camera determining the plurality of views is substantially circular around the seed model.

8. The computer-implemented method according to claim 3, wherein:
  the locus of a virtual camera determining the plurality of views is substantially spherical or substantially hemispherical around the seed model.

9. The computer-implemented method according to claim 1, the method further comprising:
  associating a 2D image of the seed model with one or more corresponding labels; and
  generating a dataset comprising the corresponding multiplicity of 2D images associated with one or more corresponding labels.

10. The computer-implemented method according to claim 1, the method further comprising:
  selecting a first background;
  rendering the seed model in front of the first background;
  storing a 2D image of the seed model in front of the first background; and
  repeating the rendering and storing using a plurality of further backgrounds to generate a dataset comprising the corresponding multiplicity of 2D images of the seed model.

11. The computer-implemented method according to claim 1, the method further comprising:
  loading a further seed model into a 3D rendering engine;
  rendering the first view of the further seed model with the first lighting arrangement;
  storing a 2D image of the first view of the seed model and the first view of the further seed model with the first lighting arrangement; and
  repeating the rendering and storing using a plurality of further views and a plurality of further lighting arrangements to generate a multiplicity of 2D images of the seed model and the further seed model; and
  generating a dataset comprising the corresponding multiplicity of 2D images of the seed model and the further seed model.

12. The computer-implemented method according to claim 1, the method further comprising:
  loading a further instance of the seed model into the 3D rendering engine;
  rendering the first view of the further instance of the seed model with the first lighting arrangement;
  storing a 2D image of the first view of the seed model and the first view of the further instance of the seed model with the first lighting arrangement; and
  repeating the rendering and storing using a plurality of further views and a plurality of further lighting arrangements to generate a multiplicity of 2D images of the seed model and the further instance of the seed model; and
  generating a dataset comprising the corresponding multiplicity of 2D images of the seed model and the further instance of the seed model.

13. The computer-implemented method according to claim 1, wherein:
  the locus of a virtual camera determining the plurality of views is substantially circular around the seed model.

14. The computer-implemented method according to claim 1, wherein:
  the locus of a virtual camera determining the plurality of views is substantially spherical or substantially hemispherical around the seed model.

15. The computer-implemented method according to claim 1, further comprising:
  analyzing a plurality of additional images using the trained machine learning algorithm to recognize if the object is present in one or more of the plurality of additional images.

16. A computer-implemented method for recognizing an object, comprising:
  loading a seed model into a 3D rendering engine;
  selecting a first lighting arrangement;
  selecting a first view of the seed model;
  rendering the first view of the seed model with the first lighting arrangement;
  storing a 2D image of the first view of the seed model with the first lighting arrangement;
  repeating the rendering and storing using a plurality of further views and a plurality of further lighting arrangements to generate a multiplicity of 2D images of the seed model;
  associating each 2D image of the multiplicity of 2D images of the seed model with one or more corresponding labels, each label including a condition associated with the respective 2D image;
  generating a dataset comprising the multiplicity of 2D images associated with the one or more corresponding labels;
  training a machine learning algorithm using the dataset;
  monitoring a condition corresponding to the one or more labels; and
  analyzing a plurality of additional images to recognize if the object is present in the image based on the corresponding condition.

* * * * *